US006771797B2

(12) United States Patent
Ahmed

(10) Patent No.: US 6,771,797 B2
(45) Date of Patent: Aug. 3, 2004

(54) WATERMARKS CARRYING CONTENT DEPENDENT SIGNAL METRICS FOR DETECTING AND CHARACTERIZING SIGNAL ALTERATION

(75) Inventor: Farid Ahmed, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 10/352,338

(22) Filed: Jan. 27, 2003

(65) Prior Publication Data

US 2003/0112997 A1 Jun. 19, 2003

Related U.S. Application Data

(63) Continuation of application No. 09/689,250, filed on Oct. 11, 2000, now Pat. No. 6,512,837.

(51) Int. Cl.[7] .................................................. H04K 1/00
(52) U.S. Cl. ...................................................... 382/100
(58) Field of Search ................................ 382/100, 232; 380/210, 252, 287, 54; 713/176; 399/366

(56) References Cited

U.S. PATENT DOCUMENTS

| | | | |
|---|---|---|---|
| 5,646,997 A | * 7/1997 | Barton | 380/23 |
| 5,768,426 A | 6/1998 | Rhoads | 382/232 |
| 5,825,892 A | 10/1998 | Braudaway et al. | 380/51 |
| 5,951,055 A | 9/1999 | Mowry, Jr. | 283/93 |
| 5,974,548 A | 10/1999 | Adams | 713/200 |
| 6,064,764 A | * 5/2000 | Bhaskaran et al. | 382/183 |
| 6,065,119 A | * 5/2000 | Sandford, II et al. | 713/200 |
| 6,101,602 A | 8/2000 | Fridrich | 713/176 |
| 6,104,812 A | 8/2000 | Koltai et al. | 380/51 |
| 6,233,684 B1 | 5/2001 | Stefik et al. | 713/176 |
| 6,246,777 B1 | * 6/2001 | Agarwal et al. | 382/100 |
| 6,275,599 B1 | 8/2001 | Adler et al. | 382/100 |
| 6,285,775 B1 | * 9/2001 | Wu et al. | 382/100 |
| 6,332,031 B1 | 12/2001 | Rhoads et al. | 382/100 |
| 6,512,837 B1 | 1/2003 | Ahmed | 382/100 |
| 6,533,385 B1 | 3/2003 | Mackay et al. | 347/19 |
| 6,574,350 B1 | 6/2003 | Rhoads et al. | 382/100 |
| 6,636,615 B1 | 10/2003 | Rhoads et al. | 382/100 |
| 2001/0008557 A1 | 7/2001 | Stefik et al. | 380/202 |
| 2001/0024510 A1 | 9/2001 | Iwamura | 382/100 |
| 2002/0021824 A1 | 2/2002 | Reed et al. | 382/100 |
| 2002/0031240 A1 | 3/2002 | Levy et al. | 382/100 |
| 2002/0037093 A1 | 3/2002 | Murphy | 382/112 |
| 2002/0054355 A1 | 5/2002 | Brunk | 358/3.28 |
| 2002/0061121 A1 | 5/2002 | Rhoads et al. | 382/100 |
| 2002/0064298 A1 | 5/2002 | Rhoads et al. | 382/100 |
| 2002/0067844 A1 | 6/2002 | Reed et al. | 382/100 |
| 2002/0076082 A1 | 6/2002 | Arimura et al. | 382/100 |
| 2002/0095577 A1 | 7/2002 | Nakamura et al. | 713/176 |
| 2002/0099943 A1 | 7/2002 | Rodriguez et al. | 713/176 |
| 2002/0105679 A1 | 8/2002 | Haynes | 358/3.28 |
| 2002/0176114 A1 | 11/2002 | Zeller et al. | 358/3.28 |

FOREIGN PATENT DOCUMENTS

| | | | |
|---|---|---|---|
| EP | 0493091 A1 | 7/1992 | ......... H04N/1/387 |
| EP | 0629972 A2 | 12/1994 | .......... G06K/15/02 |
| EP | 1 041 815 A2 | * 10/2000 | ............ H04N/1/32 |
| EP | 1096429 A2 | 5/2001 | .......... G07B/17/00 |
| EP | 1173001 A2 | 1/2002 | ............ H04N/1/32 |
| EP | 1209897 A2 | 5/2002 | ............ H04N/1/32 |
| WO | WO 01/73997 A1 | 10/2001 | ............ H04K/1/02 |
| WO | WO 02/37309 A1 | 5/2002 | .......... G06F/17/00 |
| WO | WO 02/056264 A1 | 7/2002 | .......... G07D/13/00 |
| WO | WO 02/059712 A2 | 8/2002 | ........... G06F/17/60 |

OTHER PUBLICATIONS

Szepanski, "A Signal Theoretic Method for Creating Forgery–Proof Documents for Automatic Verification," Proc. IEEE 1979 Carnahan Conf. on Crime Countermeasures, May 1979, pp. 101–109.*

Matthews, "When Seeing is not Believing," New Scientist, No. 1895, Oct. 16, 1993, pp. 13–15.*

Friedman, "The trustworthy Digital Camera: Restoring Credibility to the Photograpic Image," IEEE Trans. Consumer Electronic vol. 39, No. 4, Nov. 1983, pp. 905–910.*

Walton, "Image Authentication for a Slippery New Age," Dr. Dobb's Journal, Apr. 1995, pp. 18–20, 22, 24, 26, 82, and 84–87.*

Schneider, "A Robust Content Based Digital Signature for Image Authentication," Proc. IEEE Int. Conf. on Image Processing (vol. III), Sep. 1996, pp. 227–230.*

Lin et al., "Generating Robust Digital Signature for Image/Video Authentication," Proc. Multimedia and Security Workshop at ACM Multimeida'98, Sep. 1998, pp. 49–54.*

Dittmann, "Chapter 3: Telltale Watermarking," In Multiresolution Digital Watermarking: Algorithms and Implications for Multimedia Signals, Ph.D. thesis at Univ. of Toronto, 1999, pp. 23–52.*

Lin et al., "Issues and Solutions for Authenticating MPEG Video," Proc. SPIE vol. 3657: Security and Watermarking of Multimedia Contents, Jan. 1999, pp. 54–65.*

Xie et al., "Secure MPEG Video Communications by Watermarking," Proc. Conf of ATIRP (Advanced Telecommuniciations and Information Distribution Research Panel), Feb. 1999, pp. 459–462.*

Dittmann et al., "Content–based Digital Signature for Motion Pictures Authentication and Content–Fragile Watermarking," IEEE Proc. Int. Conf. on Multimedia Computing and Systems, Jun. 1999, pp. 209–213.*

(List continued on next page.)

Primary Examiner—Andrew W Johns
(74) Attorney, Agent, or Firm—Digimarc Corporation

(57) ABSTRACT

The invention provides methods and systems for detecting and characterizing alterations of media content, such as images, video and audio signals, using watermark messages to carry signal metrics. By comparing signal metrics extracted from the watermark to signal metrics calculated from a suspect signal, a watermark decoder can detect and even classify types of alterations to the watermarked signal.

20 Claims, 2 Drawing Sheets

OTHER PUBLICATIONS

Lamy et al., "Content–Based Watermarking for Image Authentication," Proc. 3$^{rd}$ Int. Workshop on Information Hiding, Sep./Oct 1999, pp. 187–1898.*

Queluz et al., "Spatial Watermark for Image Verification," Proc. SPIE vol. 3971: Security and Watermarking of Multimedia Contents II, Jan. 2000, pp. 120–130.*

Sun et al., "VQ–based digital signature scheme for multimedia content authentication," Proc. SPIE vol. 3971: Security and watermarking of Multimedia Contents II, Jan. 2000, pp. 404–416.*

Xie et al., "Methods for Soft Image/Video Authentication," Proc. Conf. of ATIRP (Advanced Telecommunications and Informatio Distribution Research Project), Mar. 2000, 5 pages.*

Rey et al., "Blind Detection of Malicious Alterations on Still Images using Robust Watermarks," Proc. IEE Seminar on Secure Images and Image Authentication, Apr. 2000, pp. 7/1–7/6.*

U.S. patent application Ser. No. 09/645,779, Tian et al., filed Aug. 2000.

U.S. patent application Ser. No. 09/689,226, Brunk, filed Oct. 2000.

U.S. patent application Ser. No. 09/689,296, Tian et al., filed Oct. 2000.

Bender et al., Applications for Data Hiding, *IBM Systems Journal*, vol. 39, Nos. 384, 2000, pp. 547–568.

Braudaway et al., "Application of Invisible Image Watermarks to Produce Remotely Printed, Duplication Resistant, and Demonstrably Authentic Documents," *Proc. SPIE–Int. Soc. Opt. Eng. vol. 4314*, pp. 351–359.

Communication of Postal Information Using Two–Dimensional Symbols, Draft Under Implementation, Mar. 19, 1998, 21 pages.

NCITS–WI 990124 IS 13660 Proof, 1997, 27 pages.

Schneider et al. "A Robust Content Based Digital Signature for Image Authentication," from *1996 IEEE Int. Conf. on Image Processing*.

Tian, "Wavelet–Based Reversible Watermarking for Authentication," *Proc. SPIE—Int. Soc. Opt. Eng., vol. 4675*, 2002, pp. 679–690.

Tian, "Wavelet–Based Image Compression and Content Authentication," Oct. 22, 2001, *Proc. SPIE Int. Soc. Opt. Eng, vol. 4551*, pp. 11–20.

van Schyndel et al., "Towards a Robust Digital Watermark," *Second Asia Conf. on Computer Vision*, Dec. 5, 1995, pp. 504–508.

Wu et al., "Data Hiding in Digital Binary Image," 2000 IEEE, pp. 393–396.

Yeung et al., "An Invisible Watermarking Technique for Image Verification," *Proc. Int. Conf. on Image Processing*, vol. 1, pp. 680–683, Oct. 1997.

Yeung et al., "Digital Watermarks: Shedding Light on the Invisible," 1998 IEEE, pp. 32–41.

* cited by examiner

Fig. 3

| Processing | Velocity Temporal | Spatial | Histogram Different variance | Histogram Mean Intensity | Variance Intensity | Low-freq content |
|---|---|---|---|---|---|---|
| Brightening | tiny | medium | small | large | tiny | large |
| Despeckle | large medium | small | large | tiny | large | medium |
| Gaussian Noise | large medium | small | large | tiny | medium | small |
| Median Filter (3X3) | large | small | large | small | large | large |
| Scaling | large small | small | medium | small | medium | medium |
| Compression (QF 3) | large small | tiny | large | tiny | tiny | small |
| Compression (QF 6) | large small | large | medium | tiny | tiny | tiny |
| Motion Blur (angle 2) | large | large | large | tiny | large | large |
| Sharpening | medium medium | small | medium | tiny | medium | small |
| Watermarked | large tiny | tiny | medium | tiny | small | tiny |

WATERMARKS CARRYING CONTENT DEPENDENT SIGNAL METRICS FOR DETECTING AND CHARACTERIZING SIGNAL ALTERATION

RELATED APPLICATION DATA

This application is a continuation of U.S. patent application Ser. No. 09/689,250, filed Oct. 11, 2000, now U.S. Pat. No. 6,512,837, which is hereby incorporated by reference.

The subject matter of the present application is related to that disclosed in U.S. Pat. No. 5,862,260, and in co-pending applications Ser. No. 09/234,780, filed Jan. 2, 1999, Ser. No. 09/498,223, filed Feb. 3, 2000, Ser. No. 09/503,881, filed Feb. 14, 2000; Ser. No. 60/198138, filed Apr. 17, 2000, Ser. No. 09/574,726, filed May 18, 2000, Ser. No. 09/618,948, filed Jul. 19, 2000, Ser. No. 09/625,577, filed Jul. 25, 2000, and Ser. No. 09/645,779, filed Aug. 24, 2000, which are hereby incorporated by reference.

TECHNICAL FIELD

The invention relates to multimedia signal processing, and in particular relates to hiding auxiliary information in media signals like audio, video and image signals, and using the auxiliary information to detect and characterize tampering of the signal.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference.

The invention provides methods and systems for detecting and characterizing alterations of media content, such as images, video and audio signals, using watermark messages to carry signal metrics. By comparing signal metrics extracted from the watermark to signal metrics calculated from a suspect signal, a watermark decoder can detect and even classify types of alterations to the watermarked signal. The watermark decoder localizes the alteration to a given block or set of blocks in the suspect image. To illustrate the alteration, the decoder may display a graphical depiction of the suspect signal, along with the block or blocks that are altered as well as the type of alteration associated with those blocks.

Further features will become apparent with reference to the following detailed description and accompanying drawings.

BRIEF DESCRIPTION OF THE DRAWINGS

FIG. 3 is a diagram of a matrix characterizing types of signal alteration relative to changes in signal metrics.

DETAILED DESCRIPTION

Figure 1:
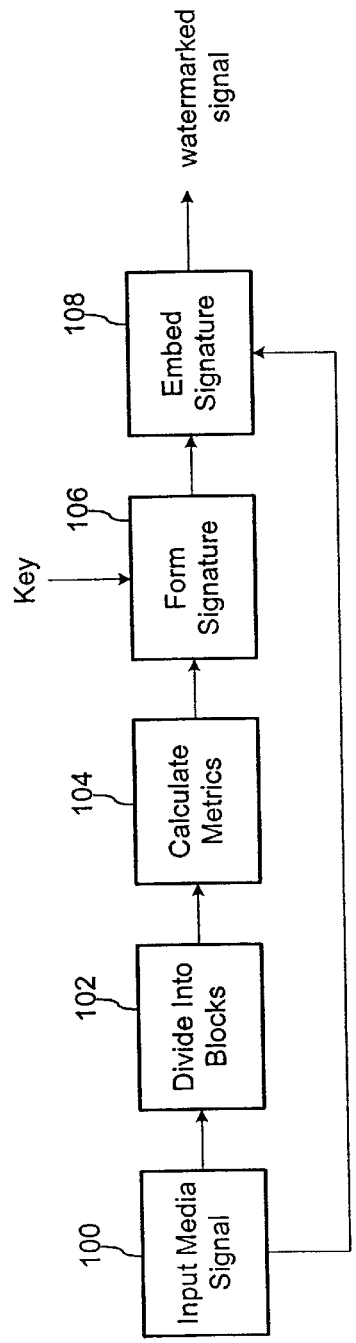
FIG. 1 shows a watermark embedding process for encoding content dependent metrics into a watermark for use in detecting and characterizing content alteration.

FIG. 1 shows a watermark embedding process for encoding content dependent metrics into a watermark for use in detecting and characterizing content alteration. To illustrate the process, consider an example application for detecting alteration of image content. In this example, a watermark embedder divides an input media signal (100) (e.g., a host image) into blocks (102). It then calculates signal metrics for each block (104). The metrics for each block form a signature (106). The embedder quantizes the metrics in the signature and encodes the resulting signature as part of a watermark message in the block using a watermark embedding process (108), such as the methods described in U.S. Pat. No. 5,862,260, and in co-pending applications Ser. No. 09/503,881. An additional enhancement of the method is to encrypt each quantized signature with an encryption key. In one implementation, the embedder calculates the signature from a combination of signal metrics in different blocks, and then embeds the signature in one or more blocks using a spread spectrum embedding function.

To illustrate the process, consider an example of three 8 bit quantized metrics per block. The metrics are concatenated to form a 24 bit number and then error correction encoding to create a binary message string. The embedder spread spectrum modulates the message string and maps elements of the resulting signal to locations within an image block (e.g., a block of luminance values). The embedder perceptually adapts the signal to the image block and adds elements in the adapted watermark signal to corresponding luminance values in the block. To increase the robustness of the watermark, the embedder can be designed to repeat the embedding process to redundantly encode the same signature into several blocks.

Other watermark embedding functions may be used as well, such as statistical feature modulation techniques where statistical features of samples in the block are adjusted to correspond to a value associated with a desired message symbol. The statistical features used for watermark embedding may be selected so as not to interfere with statistical features of the signal metrics.

The signal metrics within the signature are quantized such that the metrics are sensitive to certain types of signal alterations, but are relatively insensitive to the changes in the pixel values resulting from embedding the watermark. Preferably, the quantized metrics are the same before and after image watermark embedding. To ensure this is the case, the watermark embedder selects metrics that change less than an acceptable threshold before and after the watermark process. One way to guarantee that the metric is the same before and after encoding is to pick a signal metric that the watermark embedding function does not alter or alters only slightly. For example, the signal metric may be derived from frequency components or regions of the host signal and then embedded into other frequency components or regions of that host signal. As another example, the metric may measure a statistical feature that remains unchanged by the watermark embedding process.

The watermark embedder may also make two or more iterative embedding passes through the image on watermarked blocks in which the quantized signal metrics differ before and after the embedding process. With each pass on a particular image block, the embedder updates the metric, the image block, or both, embeds the metric and stops when the quantized metric is within an acceptable tolerance threshold before and after it is embedded into the image block. One approach is to use the quantized metric of the watermarked block as the updated metric that is embedded in the original image block. In this approach, the metric computed from the watermarked block at each pass is embedded back in the original image block until the signal metric is within an acceptable tolerance before and after embedding.

Another approach is to change the pixel values of the image block slightly on each pass so that the metric is more likely to be the same before and after watermark embedding. One example of this approach is to use the watermarked block in one pass as the input to the next pass. Here, the embedder may re-calculate the metric from the updated image and embed it into the updated image block. Alternatively, it may select a metric computed from a previous pass and embed it into the updated image block.

After watermark embedding is complete, the watermarked image may be printed, distributed electronically, or both. If the image is printed, then it is later scanned with a image scanning device to convert back to a digital form for analysis.

Figure 2:
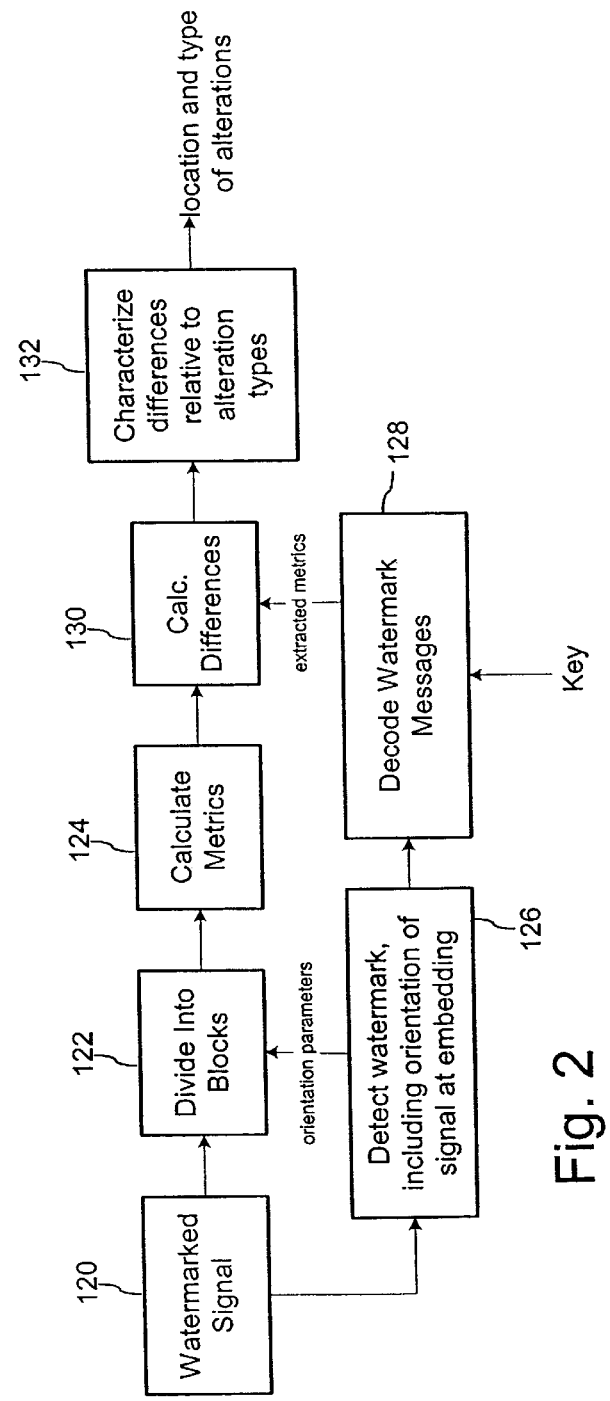
FIG. 2 shows a watermark decoding process for detecting and characterizing alterations to a watermarked image based on a comparison of signal metrics computed of the watermarked image and extracted from the watermark message.

FIG. 2 shows a watermark decoding process for detecting and characterizing alterations to a watermarked image based on a comparison of signal metrics computed of the watermarked image and extracted from the watermark message. The decoder reads the watermarked image (120), divides it into blocks of the same size used in the embedder (122), and calculates metrics that form the signature of each block (124. In some applications, a watermark decoder such as the one described in U.S. Pat. No. 5,862,260, and in co-pending application Ser. No. 09/503,881 may first re-align the watermarked image (126) to approximate its orientation state at the time of computing the signal metric and embedding the watermark.

To determine the orientation state, the decoder detects and determines the orientation of a calibration signal forming part of the watermark. The orientation state is defined by orientation parameters (e.g., rotation, scale, differential scale, shear, and shift or translation) calculated by correlating the calibration signal with the watermarked image. By compensating for geometric distortion before the signal metrics are computed, the decoder approximately aligns the image blocks to their original orientation state before calculating the signal metrics and watermark payload.

The watermark decoder extracts the watermark message payload from each block (128), potentially after re-aligning the image data using the calibration signal embedded in the watermark. Next, the decoder compares the computed signatures with the signatures extracted from the watermark (130). The decoder then provides an indication of the alterations detected and type of alterations based on the differences between the computed and extracted signatures (132). In particular, the signal metrics are known through empirical analysis to degrade in predictable ways in response to certain types of image manipulation, such as compression, scanning, printing, cropping, photocopying, selective swapping of image content, etc. Based on characterizations of these degradations, the decoder translates the degradation of the signal metrics into corresponding signal degradations. It may then display the watermarked signal along with graphic indicators highlighting altered blocks and their corresponding types of alteration.

Some of these metrics are computed for each block and some are based on the difference of information between two consecutive blocks. The size of the block depends on particular application and on the image size. If locating the area of tampering is of more importance, a smaller size is preferable with the constraint that a small sized block metric may not be statistically representative.

The size of the image block used for calculating signal metrics may be the same or different from the size of the block used to embed the watermark message. For example, in cases where the signal metric block size is larger than the watermark block size, the embedder may divide each signal metric block into sub-blocks corresponding to watermark blocks and encode the signal metrics in each of the sub-blocks.

Some Examples of Signal Metrics Include:

1. Histogram features of image blocks: histogram difference and histogram variance. The histogram difference metric is calculated as the sum of differences between the histograms of two consecutive blocks, whereas the histogram variance characterizes the brightness contrast of an individual block. One implementation, for example, used a histogram with 64 bins for an image size of 240 by 320 pixels sub-divided into blocks of 40 by 40 pixels each.

2. Motion vectors among spatially or temporally adjacent image blocks. The brightness difference between two consecutive blocks, and the rate of change of this difference are indicators of localized tampering of the signal.

For example, a temporal metric is calculated as the standard deviation of the block intensity differences. A spatial metric is calculated as the variance of edge information of a block. One implementation, for instance, computes horizontal and vertical edge information by separately convolving the image block with a high pass filter (e.g., such as a Sobel filter) in the horizontal and vertical directions. It then computes the sum of squares of each value in the respective high pass filter outputs. Finally, it computes the spatial signal metric as the standard deviation of the sum of squares.

A velocital metric is computed as a statistical measure of the ratio of the temporal over the spatial metrics.

3. Pixel intensity based metrics: average and variance of intensity across the block;

4. Frequency content metrics: ratio of low frequency content to total energy in a block.

In one implementation, the watermark embedder inserts signature comprised of three quantized metrics: a measure of edges in the block (the spatial metric); a motion vector metric calculated as a function of the difference between the block and an adjacent block (the temporal metric), and a ratio of the first and second metrics (the velocital metric).

FIG. 3 is a matrix of characterizations showing how these signal metrics have been found to correspond to types of degradations. The matrix entries indicate the extent to which the metric specified at the head of the column changes after processing specified in the corresponding row. This or a similar matrix may be used to construct a parametric model that characterize a type of alteration based on the extent of changes to each of the signal metrics embedded in the watermark. To characterize a type of alteration to the watermarked signal, the decoder applies the changes measured in the signal metrics to the model, which maps the changes to one or more alteration types. The decoder may then provide visual feedback, displaying the watermarked signal, graphically highlighting the blocks detected as being altered and displaying the type or types of alteration.

The last row of the matrix shows the effect of a form of spatial spread spectrum watermarking, where a spatial, pseudo random watermark image is added to the image. To generate the watermark image, a watermark message is spread over a pseudorandom number and the resulting values mapped to locations in an image block. The watermark image values are perceptual adapted so as to be substantially imperceptible in the watermarked image. As evidenced in the last row, certain metrics are highly sensitive to this type of watermarking process. Thus, if this type of watermark is used to embed signal metrics, it should be used in conjunction with signal metrics that are less sensitive to it, or it should be embedded in parts of the image (e.g., spatial areas or frequencies) that are independent of those from which the signal metric is calculated.

For many applications, signal metrics are typically tuned to detect specific types of alteration, like compression, photocopying, printing, scanning, etc. Knowing that degradation due to photocopying an image is different in the direction the paper is moving compared to its orthogonal direction, one is prompted to choose a pair of metrics that enables a comparison of horizontal and vertical characteristics of an image block. Photocopying of watermarked images can be detected, for example, by encoding horizontal edge information in one metric and vertical edge information in another metric. The extent of the differences in the horizontal and vertical edge information may be used to detect photocopying. In particular, if the watermark decoder measures horizontal or vertical edge information changes that exceed an acceptable tolerance, it deems the image to have been altered. This application of signal metrics is useful in determining whether a printed article is genuine.

Frequency domain analysis and frequency domain watermarks may be used to characterize certain types of signal alteration. In one implementation, a watermark encoder performs a wavelet packet decomposition of an image to calculate a energy distribution signature and embeds this signature into a watermark. The energy distribution signature shows the actual bands (in a complete wavelet packet decomposition) of the embedding of the localization signature which is obtained from the metrics described above.

A wavelet packet decomposition of an image decomposes the image into a tree structure where each child node represents a wavelet decomposition of the original image, or a block of the image. Child nodes are selected for further decomposition if the entropy of the image band at the node is greater than a predetermined entropy threshold.

A compatible watermark decoder analyzes features calculated from a wavelet packet decomposition of a watermarked image to detect alteration. In particular, the watermark decoder analyzes the entropy of selected nodes of the decomposition and detects and characterizes alteration by applying detected changes in entropy at the nodes to a parametric model. This model characterizes certain types of alterations based on how they alter entropy at nodes of the wavelet packet decomposition.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

While the invention is illustrated with reference to images, it also applies to other media types including audio. In the case of audio, the signal metrics may be computed from and embedded into temporal blocks of an audio signal. The watermark embedding may modulate features in the time, frequency, or some other transform domain of the host audio signal block. The signal metrics may be based on statistical features of the time domain audio data or frequency domain audio data. Preferably, the signal metrics are embedded into features of the audio signal block from which they are derived in a manner that does not interfere with the value of the signal metric. In other words, the signal metrics for a block are within an acceptable tolerance before and after watermark embedding of the signal metric. The tolerance level is set so that alterations being detected are distinguishable from slight changes in the signal metrics due to the watermark embedding process. The signal metrics may be computed from data in one set of frequencies and then embedded into another set for each block of audio in an audio signal file. Additionally, the signal metrics may be computed from one set of samples in a block and embedded into another set of samples in the block.

In addition to signal metrics, the watermark may be used to convey other information, such as an identifier of the content, an index to related metadata, rendering control instructions, etc. For example, the watermark can carry a network address or index to a network address to link the watermarked signal to a network resource such as a related web site. Some blocks may be used to carry signal metrics, while others may be used to carry other payload information, such as metadata, or a pointer to metadata stored in an external database.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of determining whether a printed object is genuine comprising:

receiving an image scanned from the object;

extracting one or more digital watermarks embedded in the image;

using the one or more digital watermarks along with one or more signal metrics derived from the image as input to a parametric model; and using the parametric model to classify the object as an original or copy.

2. The method of claim 1 wherein the one or more digital watermarks convey information about signal metrics used in the parametric model to classify the object.

3. The method of claim 1 wherein at least one of the digital watermarks is used for calibration of the image before computing one or more signal metrics used in the parametric model.

4. The method of claim 3 wherein calibration includes compensating for geometric distortion of the image.

5. The method of claim 1 wherein one or more digital watermarks carry a signal metric that is compared with a signal metric derived from the image to classify the object.

6. The method of claim 1 wherein the signal metrics include frequency metrics derived from the image.

7. The method of claim 1 wherein the signal metrics include statistical features derived from the image.

8. The method of claim 7 wherein the statistical features include image histogram features.

9. The method of claim 1 wherein the signal metrics are block based metrics derived from blocks of the image.

10. The method of claim 1 wherein the one or more digital watermarks are used to localize alterations to the object to particular locations in the image.

11. The method of claim 1 wherein the one or more signal metrics are used to localize alterations to the object to particular locations in the image.

12. The method of claim 6 wherein the signal metrics include a metric based on a wavelet transformation of the image.

13. A tangible medium on which is stored instructions for performing the method of claim 1.

14. The method of claim 1 wherein the one or more digital watermarks carry a message payload conveying one or more signal metrics to the parametric model.

15. The method of claim 14 wherein the message payload is encrypted.

16. A reader for determining whether a printed object is genuine comprising:

a scanner for scanning an image scanned from the object;

a digital watermark detector for extracting one or more digital watermarks embedded in the image; and a parametric model that uses the one or more digital watermarks along with one or more signal metrics derived from the image as input and classifies the object as an original or copy based on the one or more signal metrics.

17. The reader of claim 16 wherein the metrics include frequency domain metrics.

18. The reader of claim 16 wherein the metrics include histogram metrics.

19. The reader of claim 16 wherein the metrics are block based and can be used to detect alteration of individual blocks corresponding to spatial locations on the object.

20. A method of determining whether a printed object is genuine comprising:

receiving an image scanned from the object;

extracting one or more digital watermarks embedded in the image, the one or more digital watermarks conveying a message payload conveying information about a signal metric;

using the one or more digital watermarks along with one or more signal metrics derived from the image as input to a parametric model; and using the parametric model to classify the object as an original or copy.

* * * * *